United States Patent
Krpan et al.

(10) Patent No.: US 10,822,495 B2
(45) Date of Patent: Nov. 3, 2020

(54) THERMOPLASTIC COMPOSITION (71) Applicant: FKUR KUNSTSTOFF GmbH, Willich (DE)

(72) Inventors: Karel Krpan, Padua (IT); Edmund Dolfen, Krefeld (DE); Carmen Michels, Willich (DE); Frank-Martin Neumann, Hoechenschwald (DE)

(73) Assignee: FKuR Property GmbH, Willich (DE)

( * ) Notice: Subject to any disclaimer, the term of this patent is extended or adjusted under 35 U.S.C. 154(b) by 128 days.

(21) Appl. No.: 16/083,511

(22) PCT Filed: Mar. 7, 2017

(86) PCT No.: PCT/EP2017/055361
§ 371 (c)(1),
(2) Date: Sep. 9, 2018

(87) PCT Pub. No.: WO2017/153431
PCT Pub. Date: Sep. 14, 2017

(65) Prior Publication Data
US 2019/0077958 A1  Mar. 14, 2019

(30) Foreign Application Priority Data
Mar. 10, 2016  (DE) ........................ 10 2016 104 379

(51) Int. Cl.
C08L 77/12 (2006.01)
C08L 67/02 (2006.01)
C08K 5/053 (2006.01)
C08L 67/04 (2006.01)
C08L 75/04 (2006.01)
C08L 3/02 (2006.01)
C08K 3/013 (2018.01)
C08K 3/30 (2006.01)
C08K 3/32 (2006.01)
C08L 3/12 (2006.01)
C08L 75/08 (2006.01)

(52) U.S. Cl.
CPC .............. C08L 77/12 (2013.01); C08K 3/013 (2018.01); C08K 3/30 (2013.01); C08K 3/32 (2013.01); C08K 5/053 (2013.01); C08L 3/02 (2013.01); C08L 3/12 (2013.01); C08L 67/02 (2013.01); C08L 67/04 (2013.01); C08L 75/04 (2013.01); C08L 75/08 (2013.01); C08K 2003/3045 (2013.01); C08K 2003/326 (2013.01)

(58) Field of Classification Search
CPC .......... C08L 77/12; C08L 75/04; C08L 75/08; C08L 3/02; C08L 67/04; C08L 67/02; C08K 3/013; C08K 3/30; C08K 3/32; C08K 3/12; C08K 2003/3045; C08K 2003/326; C08K 5/053
See application file for complete search history.

(56) References Cited

U.S. PATENT DOCUMENTS

| | | |
|---|---|---|
| 2003/0166748 A1 | 9/2003 | Khemani et al. |
| 2006/0135668 A1* | 6/2006 | Hayes ..................... B32B 27/36 524/430 |
| 2011/0311743 A1 | 12/2011 | Kaneko et al. |
| 2013/0136879 A1 | 5/2013 | Capuzzi |

FOREIGN PATENT DOCUMENTS

WO    WO99-40797 A1    8/1999

OTHER PUBLICATIONS

Finot, E., et al.; Surface Science, 1997, vol. 384, p. 201-217.*

* cited by examiner

Primary Examiner — Robert S Jones, Jr.
(74) Attorney, Agent, or Firm — Douglas Denninger (57) ABSTRACT The present invention relates to a thermoplastic composition, in particular for use in extrusion and compounding, having a continuous phase, which comprises at least one first polymer, which is selected from a group comprising a polyester, a polyesteramide, a polyesteretheramide, an aliphatic or partially aromatic polyester urethane or mixtures thereof, in particular such compounds or mixtures having hydrophobic surface properties, and at least one dispersed phase, which, as the second polymer, comprises at least one biogenic crosslinking agent having a water content of 0.1 to 30 wt. %, in particular 5 to 25 wt. %, with reference to the total weight thereof, and wherein the first polymer of the continuous phase is not miscible with the second polymer of the dispersed phase, and has at least one inorganic filler, and at least one plasticizer. The composition according to the invention is characterized in that it has the plasticizer diglycerol or mixtures with diglycerol, and the filler is in a proportion of 0.1 to 40 wt. % with reference to the total weight of the composition.

16 Claims, 5 Drawing Sheets

THERMOPLASTIC COMPOSITION

CROSS-REFERENCE TO RELATED APPLICATIONS

This application is a national phase filing under 35 USC § 371 of international application No. PCT/EP2017/055361 filed 7 Mar. 2017, which claims priority to German Application No. 10 2016 104 379.6 filed 10 Mar. 2016. The entire contents of each of the above-mentioned applications are incorporated herein by reference.

FIELD OF THE INVENTION

The present invention relates to a thermoplastic composition, as is used in particular in extrusion and compounding, as well as to a method for producing foils, films, shaped bodies, foamed materials, coatings, lacquers, and dispersions using the thermoplastic composition according to the invention and foils, films, shaped bodies, foamed materials, coatings, lacquers, and dispersions produced by means of the method according to the invention.

BACKGROUND OF THE INVENTION

Thermoplastic compositions, in particular those involving biogenic polymers, are known in the prior art and are in particular used in extrusion and compounding. Methods based on the prior art for producing polymer mixtures usually follow the basic schema that a polymeric carrier material, as the main constituent of a formulation, is extruded together with one or more other polymers. In order to be able to vary the specific properties of the product and at the same time reduce the formulation costs, fillers are very frequently added, usually in the upper region of the feed zone of the extruder. The purpose of other additives is to improve the compatibility between the polymeric educts and the fillers. Lastly, plasticizers are indispensable in many formulations, both for process control and for product result.

A stable and robust process control is of crucial importance for an optimum result and the percentage of water in the compound is critical.

Water can be used as a formulation component in compounding and extrusion processes and in particular in its function as a plasticizer. However, the use of water in particular has the disadvantages described in the following.

Extrusion processes typically take place far above the boiling point of water, so that, in the case of incomplete degassing, the water-containing compound foams uncontrollably. At the same time, extrusion processes take place under applied high pressure. Thus, the pressure drops abruptly in the region of the outlet nozzle of the extruder. This means that an abrupt expansion of the extrudate water occurs there, which results in increased foaming of the extrudate at the outlet nozzle with hindering effects on the extrusion result and the further process control. Efficient degassing, for example by vacuum suction, can potentially counteract this effect, but is associated with considerable technical complexity.

Furthermore, under typical extrusion conditions at zone temperatures of >>130° C., which are customarily required for such compositions, water already functions as an electron donor (Lewis base), because water has open valences that are suitable for forming covalent bonds and thus trigger adverse nucleophilic reactions. The hydrolytic degradation of polyesters is a sufficiently known adverse effect in the prior art, wherein, in addition to the actual degradation reaction, similarly unwelcome post-polymerizations and crosslinking reactions can occur. In typical biogenic polymers, such as polysaccharides, hemicelluloses, or polyhydroxyalkonates, as well as petroleum-based biodegradable polymers, such as the polyvinyl derivatives, this leads to cleavage reactions, the formation of small molecule fragments, and transesterifications, so that the extrusion process as a whole can become uncontrollable. In addition, water usually undesirably forms azeotropic mixtures with many small molecules of different polarity, in which the vapor phase and the liquid phase are the same. The composition of said mixtures has uncontrollable effects on the compounding and extrusion processes. Water can naturally be trapped by using crosslinking anhydrides, such as, for example, maleic acid, succinic acid, phthalic acid, or caprolactam. This inevitably leads to potentially adversely altered material properties, however, because the anhydrides are converted to chain extenders or crosslinking agents.

For many biodegradable and/or compostable plastics, however, a significantly higher unfavorable water content is often unavoidable. Starch, for example, especially also in its native form, is frequently added to these plastics as a structural element that replaces conventional non-biogenic structuring agents. Water is a structural component of native, macromolecular starch with a proportion of approximately 12-20%. Even in modified forms of starch, contained water values >5% are still reached. Due to the relatively high contained water content of the starches, unless evaporation can be suppressed by vacuum suction, the incorporation of starches into the compound represents a method-related problem for the compounding process. The often incomplete decomposition of the specific starches can lead to uncontrollable results as well.

Under the effect of heat, as occurs during extrusion, starch can furthermore physically bind many times its own weight in water, swell, and gelatinize. When heated with water, starch swells at about 47-57° C. due to the incorporation of water, and so-called starch paste, the viscosity of which is a function of the type of starch, forms at about 55-87° C. due to the decomposition of starch. In doing so, the already gelatinized starch can support gas retention in the extrudate and lead to solid pores with the correspondingly undesirable consequences for the further control of the process.

In order to be able to easily process the starch during extrusion and compounding, a plasticizer has to be used with biodegradable and/or compostable plastics that contain starch. Numerous plasticizers used for compounding and extrusion processes are known in the prior art.

SUMMARY OF THE INVENTION

The object of the present invention is to at least in part overcome the disadvantages known in the prior art. The abovementioned object is achieved with a thermoplastic composition according to the invention according to Claim 1. In particular, according to the invention, fillers and/or plasticizers are used not only for product variation and cost control, but also as quenchers for trapping water or rendering it inert during the compounding and extrusion process. Preferred embodiments of the thermoplastic composition are the subject matter of the dependent claims.

The thermoplastic composition according to the invention for use in extrusion and compounding comprises:
(a) a continuous phase having at least one first polymer, which is selected from a group having a polyester, a polyesteramide, a polyesteretheramide, an aliphatic or partially aromatic polyester urethane, or mixtures thereof, in particular such compounds or mixtures having hydrophobic surface properties,
(b) at least one dispersed phase, which
(i) as the second polymer, comprises at least one biogenic crosslinking agent having a water content of 0.1 to 30 wt. %, in particular 5 to 25 wt. %, with reference to the total weight thereof, and wherein the first polymer of the continuous phase is not miscible with the second polymer of the dispersed phase, and
(ii) has at least one inorganic filler, and
(iii) at least one plasticizer.

The thermoplastic composition according to the invention is characterized in that the plasticizer comprises diglycerol or mixtures with diglycerol, and the filler is in a proportion of 0.1 to 40 wt. % with reference to the total weight of the composition.

In the context of the present invention, "hydrophobic" should be understood to mean the tendency not to bind or temporarily physically take up water and/or, in hydrated form, not to take up additional water molecules. In particular the surfaces of the first polymer can be modified with hydrophobic coatings, primers or sealants.

According to a preferred embodiment of the composition according to the invention, the thermoplastic composition has the plasticizer diglycerol in an enantiomeric ratio of
(a) $\alpha,\alpha'$-diglycerol from 40 to 80 wt. % in particular 50 to 70 wt. %, and particularly preferably approximately 65 wt. %,
(b) $\alpha,\beta$-diglycerol from 15 to 50 wt. %, in particular 25 to 40 wt. %, and particularly preferably approximately 30 wt. %, and
(c) $\beta,\beta'$-diglycerol from 1 to 20 wt. %, in particular 2 to 10 wt. %, and particularly preferably approximately 5 wt. %
with reference to the sum of the $\alpha,\alpha'$-, $\alpha,\beta$-, and $\beta,\beta'$-diglycerol.

It has surprisingly been shown that the use of such modified enantiomeric ratios for the diglycerol in a thermoplastic composition can at least in part overcome the described prior art problems in compounding and extrusion processes, and that in particular the described uncontrollable nucleophilic reaction mechanisms caused by gaseous water in the compound are suppressed. The azeotropic effect is furthermore suppressed after mixing water-containing compound with added glycerol, so that glycerol can be used in combination with such modified enantiomeric ratios for the diglycerol according to the invention. For a composition modified in this way, for example, it has surprisingly been found that glycerol can be added to the thermoplastic composition as a plasticizer component without the occurrence of any appreciable evaporation of the extrudate water with the described adverse effects, even in proportions up to 60% and up to extruder zone temperatures of approximately 190° C. in current practice. The use of such enantiomeric ratios for the diglycerol further allows the addition of so-called polyglycerols to the compound, wherein said polyglycerols are not defined compounds, but are oligomers, which are produced on the basis of the glycerol monomer and have statistical chain length distributions. Polyglycerols beyond the trimer, such as, for example, the glycerol trimer, tetramer, pentamer, hexamer, heptamer, octamer, nonamer, decamer, or multiples thereof, can be used according to the invention. Due to their high viscosity, these are difficult to incorporate into the compounding process without the use of the ienantiomeric ratio for the diglycerol according to the invention. The reason for this is that these are liquids with very high viscosities, which, even with a temperature-related decrease of the viscosity, make precisedosing virtually impossible and prevent proper mixing into the compound along the screw channel of the extruder.

According to another preferred embodiment of the thermoplastic composition according to the invention, the plasticizer comprises a mixture of
(a) diglycerol and triglycerol or
(b) diglycerol and glycerol or
(c) diglycerol, triglycerol and glycerol,
wherein the mixture under (a), (b) and (c) contains at least between 25 and 75 wt. % of the diglycerol in this composition with reference to the sum
(a) of the diglycerol and the triglycerol, (b) the diglycerol and the glycerol, or (C) the diglycerol, glycerol and triglycerol.

According to another preferred embodiment of the thermoplastic composition according to the invention, the inorganic filler has hydrophilic properties.

In the context of the present invention, "hydrophilic" should be understood to mean the tendency to bind or temporarily physically take up water and/or, in hydrated form, to take up additional water molecules.

The hydrophilic inorganic fillers according to the invention therefore advantageously function as scavengers (quenchers) of the water in the thermoplastic composition, and thus counteract the uncontrollable nucleophilic reaction mechanisms caused by gaseous water in compounding and extrusion processes, in particular during extrusion in the region of the outlet nozzle of the extruder.

In particular the surfaces in the inorganic fillers according to the invention, but also the inner constituents, can have hydrophilic properties. In particular the surfaces of the inorganic fillers can be modified with hydrophilic coatings, primers, or sealants.

According to another preferred embodiment of the thermoplastic composition according to the invention, the inorganic filler comprises mineral substances selected from a group consisting of alkaline earth metals and their salts, bentonite, carbonates, silicic acids, silica gel, salts of alkaline earth metals with silicic acid and silicates, in particular chalks, dolomites, and/or talcum.

According to another particularly preferred embodiment of the thermoplastic composition according to the invention, the inorganic filler comprises chalks, dolomites and/or talcum.

According to another preferred embodiment of the thermoplastic composition according to the invention, the inorganic filler comprises salts of an alkaline earth metal, preferably sulfates and/or phosphates of calcium and/or magnesium.

The use of these last-mentioned fillers has the additional advantage that they can be used to produce elasticity values that are comparable to those achieved with talcum. This circumstance is particularly interesting, because the carcinogenic potential of talcum is considered to be comparable to that of asbestos.

Increased elongation at break and tear propagation work of the material in comparison to a composition without such inorganic fillers is thus achieved, in particular when sulfate salts of an alkaline earth metal are used. It has further surprisingly been shown that sulfate salts of an alkaline earth metal, in particular, alone and particularly in combination with diglycerols in the enantiomeric ratios according to the invention, are suited to improve the compounding process, and also reduce or prevent the problems of bubble formation and foaming at the outlet nozzle of the extruder during extrusion.

According to another preferred embodiment of the present invention, the salts of the alkaline earth metals are calcium sulfates, preferably gypsum, such as natural gypsum, natural anhydrite, flue gas gypsum, or mixtures thereof.

In particular gypsum in combination with diglycerols in the enantiomeric ratios according to the invention is particularly advantageous for improving the compounding and extrusion processes.

According to another preferred embodiment of the thermoplastic composition according to the invention, the salts of the alkaline earth metals are phosphates, preferably apatite, phosphorite and hydroxylapatite, or salts and condensates of ortho-phosphoric acid, such as salts of the pyrophosphates, polyphosphates and here specifically calcium polyphosphate, potassium polyphosphate, magnesium phosphate, sodium polyphosphate, sodium calcium polyphosphate, sodium magnesium polyphosphate, and cyclophosphates of the alkali and alkaline earth metals potassium, sodium, magnesium, and calcium.

Another preferred embodiment of the thermoplastic composition according to the invention, wherein the first polymer of the continuous phase
(a) has biogenic or partially biogenic components and/or is selected from a group of polyhydroxy acids, polyhydroxyalkanoates, polylactides and lignins and their derivatives and/or copolymers, and is in particular selected from a group consisting of polybutylene adipate terephthalate (PBAT), polybutylene sebacate terephthalate (PBST), polybutylene succinate (PBS), polybutylene succinate adipate (PBSA), and/or
(b) has synthetic components and is selected from a group of aliphatic and aromatic polyesters and aliphatic-aromatic copolyesters, for example polybutylene adipate terephthalate (PBAT).

According to a particularly preferred embodiment of the thermoplastic composition according to the invention, the biogenic or partially biogenic component or the synthetic component is polybutylene adipate terephthalate (PBAT) or has polybutylene adipate terephthalate (PBAT).

According to another particularly preferred embodiment of the thermoplastic composition according to the invention, the biogenic component (a) is polybutylene sebacate-co-terephthalate (PBST) or has polybutylene sebacate-co-terephthalate (PBST).

According to another particularly preferred embodiment of the thermoplastic composition according to the invention, the biogenic component (a) is polybutylene succinate (PBS) or has polybutylene succinate (PBS).

According to another particularly preferred embodiment of the thermoplastic composition according to the invention, the biogenic component (a) is polybutylene succinate adipate (PBSA) or has polybutylene succinate adipate (PBSA).

According to another preferred embodiment of the thermoplastic composition according to the invention, the composition comprises at least one amorphous or semicrystalline and, in particular, biogenic polymer as a further dispersed phase.

In the context of the present invention, "semicrystalline" is understood to mean a solid, which has both crystalline and amorphous regions (domains).

According to another preferred embodiment of the thermoplastic composition according to the invention, the amorphous or semicrystalline and in particular biogenic polymer is a polymer or copolymer of polylactic acid (PLA) or a polymer or copolymer of polyhydroxyalkanoates (PHA) and here particularly of polyhydroxybutyrate (PHB), polyhydroxyvalerate (PHV), polyhydroxybutyrate-valerate (PHBV), polyhydroxybutyrate-hexanoate (PHBH), polyhydroxyhexanoate (PHH), polyhydroxyoctanoate (PHO), or a mixture of at least two of the aforementioned.

According to another preferred embodiment of the thermoplastic composition according to the invention, the biogenic crosslinking agent of the dispersed phase comprises polysaccharidic structural elements which originate from a group that includes starches, each of which in particular contains a specific composition of amylose and amylopectin, such as from potato, corn, buckwheat, wheat, rye, oats, barley, rice, peas, and tapioca.

Here, "starch" refers to all types of starch, i.e. flour, natural starch, chemically and/or physically modified starch, hydrolyzed starch, destructured starch, gelatinized starch, plasticized starch, thermoplastic starch, and mixtures thereof.

Starches that are completely destructured, or are suited for being easily largely destructured, have proven to be particularly advantageous.

The biogenic crosslinking agent of the dispersed phase of the present invention advantageously comprises more than one polysaccharidic structural element. Mixtures containing starch and at least one additional polysaccharidic structural element as a biogenic crosslinking agent of the dispersed phase are particularly preferred.

In a preferred embodiment of the thermoplastic composition according to the invention, in addition to starch, the biogenic crosslinking agent of the dispersed phase has at least one additional polysaccharidic structural element, in particular selected from the group consisting of cellulose, hemicellulose and/or their derivatives, in particular acetate, ester, and ether derivatives.

According to another preferred embodiment of the thermoplastic composition according to the invention, the ratio of the polysaccharidic structural elements of the dispersed phase to the at least one first polymer of the continuous phase is 10 to 90 wt. % up to 90 to 10 wt. %, preferably in a ratio of 30 to 70 wt. % up to 70 to 30 wt. %, and more preferably in a ratio of 60 to 40 wt. % up to 40 to 60 wt. %, with reference to the sum of the polysaccharidic structural elements of the dispersed phase to the at least one first polymer of the continuous phase.

According to another preferred embodiment of the thermoplastic composition according to the invention, the composition is biodegradable and/or compostable.

According to another preferred embodiment of the thermoplastic composition according to the invention, the composition additionally comprises further additives, selected from the group consisting of dispersants, lubricants, agents protecting against water, crosslinking agents, phase compatibilizers, mold release agents, miscibility improvers, UV stabilizers, and catalysts, as well as antioxidants.

Chain extenders, such as mono-, di- and polyepoxides, polyepoxide acrylates and their copolymers with styrene, aliphatic, aromatic or aliphatic-aromatic carbodiimide oligomers and polymers, isocyanates, isocyanurates and combinations thereof, anhydrides and polyanhydrides, which improve the compatibility between the polysaccharidic structural element or the polysaccharidic structural elements and the other polymers of the composition, can likewise be added.

The present invention furthermore includes the respective use of the various described compositions according to the invention as premixtures (master batches) in prior art methods.

The present invention further relates to a method for producing foils, films, shaped bodies, foamed materials, coatings, lacquers, and dispersions using the thermoplastic composition according to the invention.

The foils, films, shaped bodies, foamed materials, coatings, lacquers, and dispersions produced by means of the method according to the invention are likewise the subject matter of the present invention.

Shaped bodies in the sense of the invention, such as, for example, plates, panels, profiles, and hollow bodies, in particular bottles and containers, are known in the prior art.

According to a preferred embodiment, the foils, films, and shaped bodies according to the invention have a wall thickness of between 5 μm and 1000 μm or a wall thickness of between 10 μm and 2000 μm.

The present invention further also relates to the use of the thermoplastic composition according to the invention, in particular in extrusion and compounding for producing foils, films, shaped bodies, foamed materials, coatings, lacquers, and dispersions. The invention can also include the use of the thermoplastic composition for injection molding, spraying, calendering, rotational molding, immersion, painting, coating, and casting.

The invention is explained in the following using preferred design examples, whereby it shall be noted that modifications or additions such as are directly apparent to the person skilled in the art as a result of these examples are included. These design examples furthermore do not represent a limitation of the invention such that modifications and additions are within the scope of the present invention.

DETAILED DESCRIPTION OF THE PRESENTLY PREFERRED EMBODIMENTS

Design Examples

Formulations and Process Parameters with Diglycerol

Variant 1

| PBAT | Extruder | TSA EMP 26-40 |
|---|---|---|
| Polylactide | D/L | 26 mm/40 D |
| Starch | screw rotation speed | 200 [rpm] |
| Diglycerol | Pressure in front of the nozzle | 14-15 [bar] |
| Chalk | | |
| Talcum | | |
| Additives | | | wherein, in reference to the total weight of the formulation, PBAT can be used in proportions between 30% and 70%, polylactide (dispersed phase) in proportions between 1% and 25%, starch in proportions between 1% and 25%, chalk (filler) in proportions between 1% and 25%, talcum (filler) in proportions between 1% and 25%, and additives in proportions between 0.1% and 5%, diglycerol between 1% and 6%.

| | Zone | | | | | | | |
|---|---|---|---|---|---|---|---|---|
| | 1 | 2 | 3 | 4 | 5 | 6 | 7 | 8 Nozzle |
| Target | 140 | 150 | 155 | 160 | 170 | 175 | 170 | 160 |
| Actual | 140 | 150 | 156 | 163 | 170 | 177 | 171 | 165 |

Variant 2

PBAT

Polylactide

Starch

Diglycerol

Glycerol

Talcum

Additives wherein, in reference to the total weight of the formulation, PBAT can be used in proportions between 30% and 70%, polylactide (dispersed phase) in proportions between 1% and 25%, starch in proportions between 1% and 25%, talcum (filler) in proportions between 1% and 25% and additives in proportions between 0.1% and 5%, diglycerol and glycerol between 1% and 6%.

|  | Zone | | | | | | | |
| --- | --- | --- | --- | --- | --- | --- | --- | --- |
|  | 1 | 2 | 3 | 4 | 5 | 6 | 7 | 8 Nozzle |
| Target | 140 | 150 | 155 | 160 | 170 | 175 | 170 | 160 |
| Actual | 140 | 150 | 155 | 165 | 170 | 175 | 171 | 162 |

Variant 3

| PBST | Extruder | Leistritz ZSE 40 |
| --- | --- | --- |
| Polylactide | D/L | 26 mm/40 D |
| Diglycerol | screw rotation speed | 180 [rpm] |
| Glycerol | | |
| Chalk | Pressure in front of the nozzle | 11-12 [bar] |
| Talcum | | |
| Additives | | | wherein, in reference to the total weight of the formulation, PBST can be used in proportions between 30% and 70%, polylactide (dispersed phase) in proportions between 1% and 25%, chalk in proportions between 1% and 25%, talcum (filler) in proportions between 1% and 25% and additives in proportions between 0.1% and 5%, diglycerol and glycerol between 1% and 6%.

|  | Zone | | | | | | | | | | |
| --- | --- | --- | --- | --- | --- | --- | --- | --- | --- | --- | --- |
|  | 1 | 2 | 3 | 4 | 5 | 6 | 7 | 8 | Flange 1 | Flange 2 | Nozzle |
| Target | 135 | 135 | 140 | 155 | 155 | 155 | 155 | 160 | 160 | 160 | 165 |
| Actual | 135 | 135 | 135 | 155 | 155 | 155 | 155 | 155 | 160 | 160 | 165 |

In a standard formulation consisting of a matrix polymer and another preferably biogenic polymer, the classic inorganic fillers are replaced by calcium sulfates, preferably gypsum. In the present example, the calcium sulfate compounds are gypsum-anhydride (Ca[SO$_4$]), gypsum hemihydrate (Ca[SO$_4$]×½ H$_2$O) and gypsum dihydrate (Ca[SO$_4$]×2 H$_2$O), wherein PBAT (continuous phase) can be used in proportions between 50% and 70%, polylactide (dispersed phase) in proportions between 1% and 25%, calcium sulfates (filler) in proportions between 1% and 35%, talcum (filler) in proportions between 1% and 25%, and additives in proportions between 0.1% and 5%.

| A | B | C | D |
| --- | --- | --- | --- |
| PBAT | PBAT | PBAT | PBAT |
| PLA | PLA | PLA | PLA |
| Ca[CO$_3$] (chalk) | Ca[SO$_4$] (gypsum anhydride) | Ca[SO$_4$] × ½H$_2$O (gypsum hemihydrate) | Ca[SO$_4$] × 2H$_2$O (gypsum dihydrate) |
| Talcum | Talcum | Talcum | Talcum |
| Additive | Additive | Additive | Additive |

Figure 1:
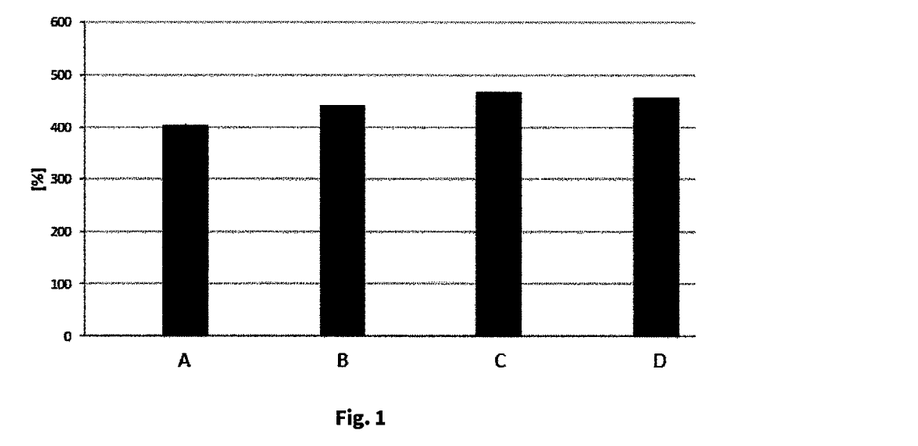
FIG. 1 the effect of the addition of calcium sulfate compounds, namely gypsum-anhydride ($Ca[SO_4]$) (B), gypsum hemihydrate ($Ca[SO_4] \times \frac{1}{2} H_2O$) (C), and gypsum dihydrate ($Ca[SO_4] \times 2 H_2O$) (D) compared to the addition of chalk ($Ca[CO_3]$, Standard) (A) on the elongation at break of the composition according to the invention.
Figure 2:
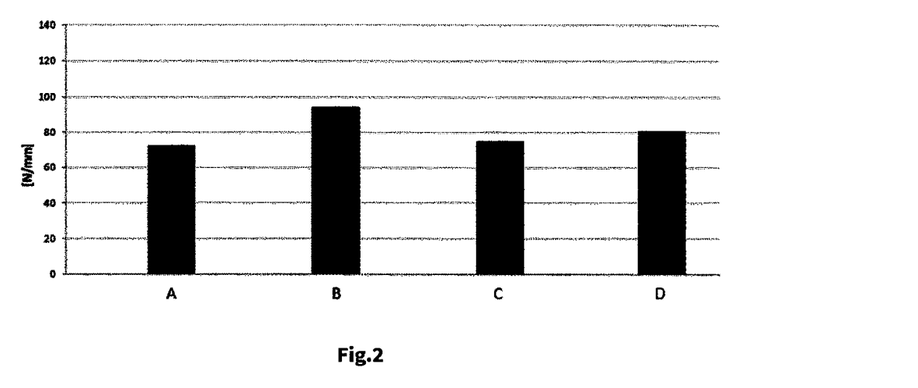
FIG. 2 the effect of the addition of calcium sulfate compounds, namely gypsum-anhydride ($Ca[SO_4]$) (B), gypsum hemihydrate ($Ca[SO_4] \times \frac{1}{2} H_2O$) (C), and gypsum dihydrate ($Ca[SO_4] \times 2 H_2O$) (D) compared to the addition of chalk ($Ca[CO_3]$, Standard) (A) on the tear propagation work of the composition according to the invention.

It has surprisingly been shown that the sulfates of calcium have a positive effect on the elongation at break and tear propagation work values. Thus, with the use of calcium sulfate, both elongation at break and tear propagation work can be improved transversely by more than 10% (FIG. 1 and FIG. 2).

Figure 3:
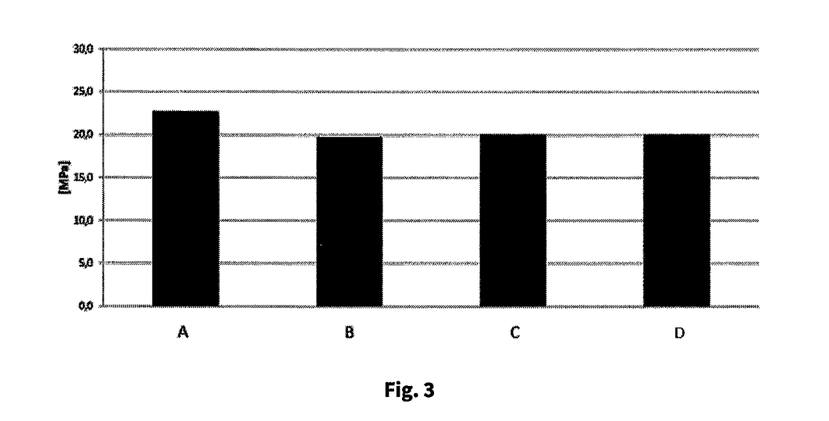
FIG. 3 the effect of the addition of calcium sulfate compounds, namely gypsum-anhydride ($Ca[SO_4]$) (B), gypsum hemihydrate ($Ca[SO_4] \times \frac{1}{2} H_2O$) (C), and gypsum dihydrate ($Ca[SO_4] \times 2 H_2O$) (D) compared to the addition of chalk ($Ca[CO_3]$, Standard) (A) on the breaking stress of the composition according to the invention.

Not all parameters can be improved at the same time with the formulation according to the invention. The use of sulfates in the compound reduces the breaking stress, which is complementary to the elongation at break. At approximately 10%, however, the deviations are relatively small (FIG. 3) and thus largely acceptable.

The positive effects of the composition according to the invention on the elongation parameters, in particular, are very attractive to the classic practical fields of application, such as tote bags, bags, or foils.

Variant 4

For reasons of cost efficiency, and also to achieve specified strength properties, a compound consisting of a matrix polymer and a dispersed polymer phase is loaded with inorganic fillers, such as chalk and talcum, in accordance with the prior art formulation (Standard). As an example of the standard mentioned here, in the present case a proportion of 6%, 12%, or 18% inorganic filler with reference to the total weight of the formulation was used.

Figure 7:
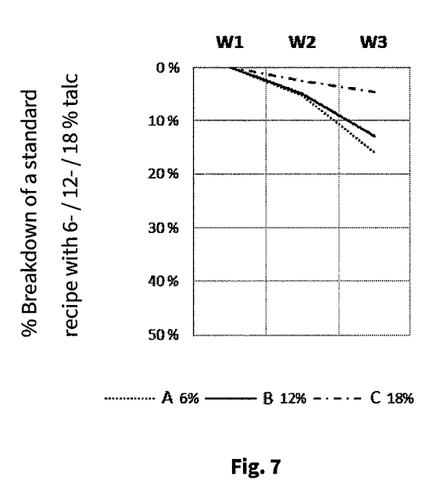
FIG. 7 the effect of the addition of various proportions of talcum ($Mg_3[Si_4O_{10}(OH)_2]$), namely 6% (A), 12% (B) and 18% (C) on the degradation of the composition according to the invention.
Figure 8:
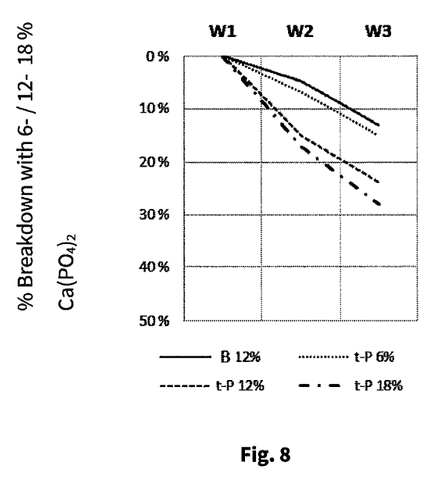
FIG. 8 the effect of the addition of various proportions of tertiary calcium phosphate ($Ca_3[PO_4]_2$) compared to the addition of 12% talcum ($Mg_3[Si_4O_{10}(OH)_2]$, Standard) (B) on the degradation of the composition according to the invention.

Replacing the chalk or talcum with tertiary calcium phosphate surprisingly showed that, already after a residence time of two weeks, the degradation rate of the compound compared to the abovementioned standard increased multifold. For example, a foil according to the invention with 6% tertiary calcium phosphate degraded 1.4 times faster than a corresponding foil with talcum (Standard) instead of tertiary calcium phosphate, a foil according to the invention with 12% tertiary calcium phosphate degraded 3.2 times faster than the standard (12% talcum), and a foil according to the invention with 18% tertiary calcium phosphate degraded 5 times faster than the standard (18% talcum) (see FIG. 7, FIG. 8). It is noteworthy that the degradation rate of the foil according to the invention tends to decrease as the inorganic filler talcum increases, but increases as the inorganic filler tertiary calcium phosphate increases. This makes a fine-tuning of the degradation rate by corresponding use of these fillers possible.

Figure 9:
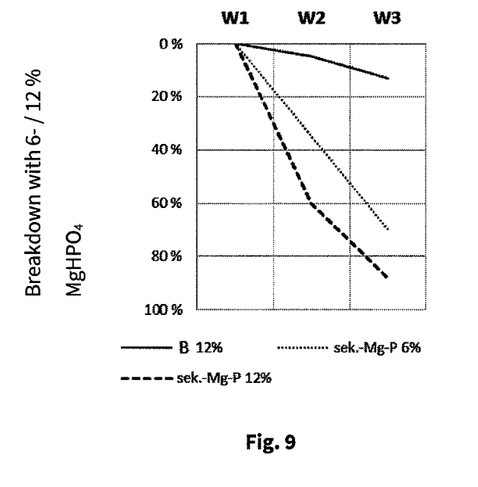
FIG. 9 the effect of the addition of 6% secondary magnesium phosphate ($MgHPO_4 \times 3H_2O$) to 6% tertiary calcium phosphate ($Ca_3[PO_4]_2$) or 12% secondary magnesium phosphate ($MgHPO_4 \times 3H_2O$) compared to the addition of 12% talcum ($Mg_3[Si_4O_{10}(OH)_2]$, Standard) (B) on the degradation of the composition according to the invention.

The increase in the degradation rate continues to be substantially enhanced, if the tertiary calcium phosphate is replaced or proportionally replaced by a secondary magnesium phosphate. In one example described here, when the proportion of the tertiary calcium phosphate was halved from 12% to 6% and 6% secondary magnesium phosphate was used, the degradation rate already increased 7-fold from 5% to 35% in comparison to a corresponding batch with talcum (12%, Standard; see FIG. 9).

Increasing the proportion of secondary magnesium phosphate 12% already results in a high multiplying factor of almost 18 for the degradation rate. For this very reason, no further increase of the magnesium-containing filler fraction was tested in the aforementioned experiments. The degradation rate is then so high that the determination of material-specific properties with respect to the strength values hardly makes any sense (not shown).

Figure 4:
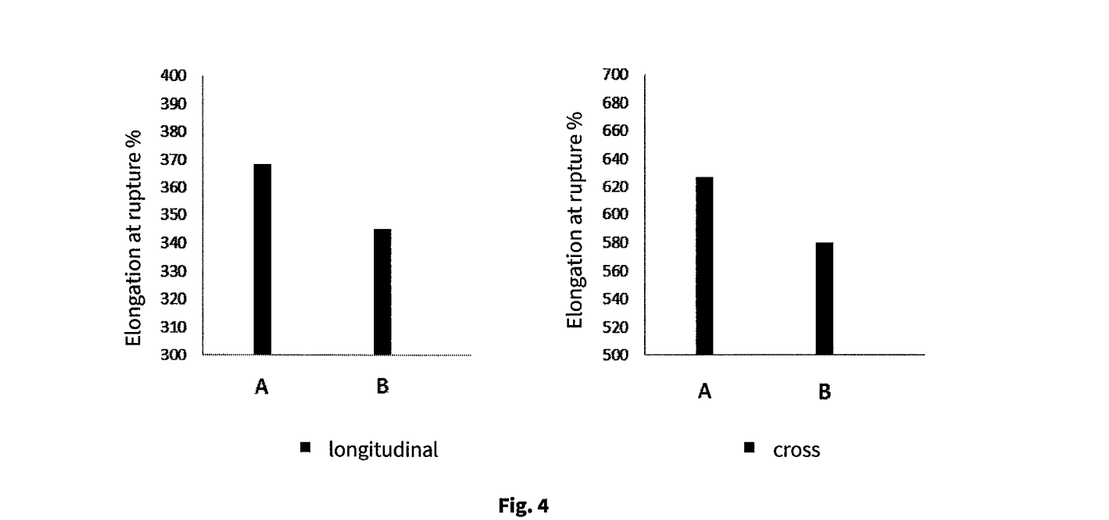
FIG. 4 the effect of the addition of tertiary calcium phosphate ($Ca_3[PO_4]_2$) (B) compared to the addition of talcum ($Mg_3[Si_4O_{10}(OH)_2]$, Standard) (A) on the elongation at break (longitudinal and transverse) of the composition according to the invention.
Figure 5:
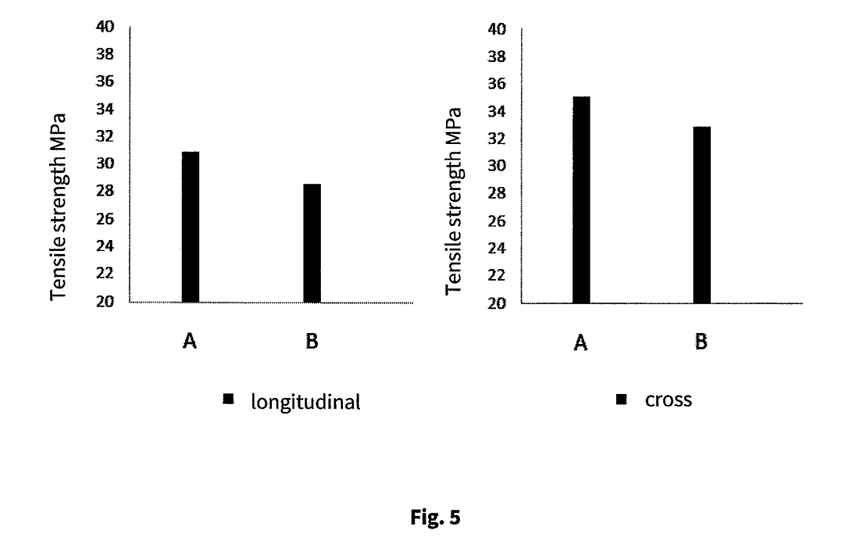
FIG. 5 the effect of the addition of tertiary calcium phosphate ($Ca_3[PO_4]_2$) (B) compared to the addition of talcum ($Mg_3[Si_4O_{10}(OH)_2]$, Standard) (A) on the tensile strength (longitudinal and transverse) of the composition according to the invention.

Aside from this last aspect, it is unexpected and advantageous that the material-specific properties of tensile strength and elongation at break of the formulations according to the invention with tertiary phosphate-containing inorganic fillers and secondary magnesium-containing phosphates up to a proportion of about 6% differ only slightly from those of the talcum-containing formulation standard (see FIG. 4, FIG. 5).

Figure 6:
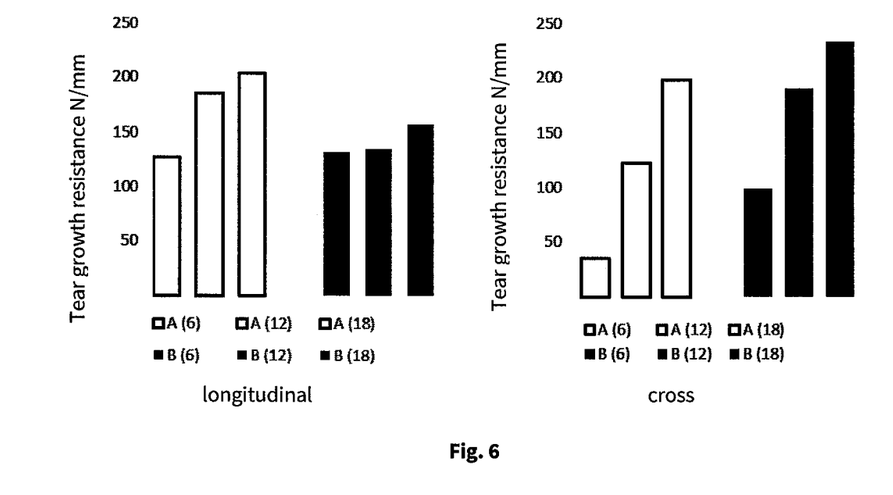
FIG. 6 the effect of the addition of tertiary calcium phosphate ($Ca_3[PO_4]_2$) (B) compared to the addition of talcum ($Mg_3[Si_4O_{10}(OH)_2]$, Standard) (A) on the tear propagation work (longitudinal and transverse) of the composition according to the invention.

This also applies to the tear propagation work (longitudinally), but not to the tear propagation work (transversely), of the formulations according to the invention in comparison to the standard formulation (see FIG. 6). Completely surprisingly, it has now become apparent that a dramatic improvement of the tear propagation work in transverse direction can be achieved by introducing phosphates into the formulation. Said tear propagation work inherently decreases as the filler content increases. Compared to the talcum-containing standard with a 6% proportion, however, it is almost 300% higher and, even at an 18% filler content, still exceeds the talcum standard by a colossal 120%.

This is particularly remarkable because, for example for a foil application after a tear is started, the tear propagation work in transverse direction is the decisive stability criterion. The present formulations according to the invention thus allow an advantageous control of the degradation behavior of biodegradable compounds by varying the formulation proportion of inorganic phosphates during production or even slight improvement of the elasticity-defining parameters.

The invention claimed is:

1. A thermoplastic composition, comprising:
   (a) a continuous phase having at least one first polymer, which is selected from a group having a polyester, a polyesteramide, a polyesteretheramide, an aliphatic or partially aromatic polyester urethane or mixtures thereof, such compounds or mixtures having hydrophobic surface properties,
   (b) at least one dispersed phase, which
      as a second polymer, comprises at least one biogenic crosslinking agent having a water content of 0.1 to 30 wt. %, with reference to the total weight thereof, and wherein the first polymer of the continuous phase is not miscible with the second polymer of the dispersed phase, and
   (ii) has at least one inorganic filler, in a proportion of 0.1 to 40 wt. % with reference to the total weight of the composition, and
   (iii) at least one plasticizer, wherein the plasticizer has diglycerol or mixtures with diglycerol, wherein the plasticizer diglycerol has an enantiomeric ratio of the following, with reference to the sum of the α,α'-, α, β-, and β, β'-diglycerol:
      (1) α,α'-diglycerol from 40 to 65 wt. %,
      (2) α,β-diglycerol from 15 to 50 wt. %, and
      (3) β,β'-diglycerol from 1 to 20 wt. %.

2. The thermoplastic composition according to claim 1, wherein the plasticizer diglycerol has an enantiomeric ratio of
   (a) α,α'-diglycerol of approximately 65 wt. %,
   (b) α,β-diglycerol of approximately 30 wt. %, and
   (c) β,β'-diglycerol of approximately 5 wt. %
   with reference to the sum of the α,α'-, α,β-, and β,β'-diglycerol.

3. The thermoplastic composition according to claim 1, wherein the plasticizer has a mixture of
   (a) diglycerol and triglycerol or
   (b) diglycerol and glycerol or
   (c) diglycerol, triglycerol and glycerol,
   wherein the mixture under (a), (b), and (c) contains at least between 25 and 75 wt. % of the diglycerol in this composition with reference to the sum (a) of the diglycerol and the triglycerol, (b) the diglycerol and the glycerol, or (c) the diglycerol, glycerol, and triglycerol.

4. The thermoplastic composition according to claim 1, wherein the inorganic filler has hydrophilic properties.

5. The thermoplastic composition according to claim 1, wherein the inorganic filler includes at least one mineral substance selected from a group consisting of alkaline earth metals and their salts, bentonite, carbonates, silicic acids, silica gel, salts of alkaline earth metals with silicic acid and silicates.

6. The thermoplastic composition according to claim 4, wherein the inorganic filler comprises salts of an alkaline earth metal.

7. The thermoplastic composition according to claim 6, wherein the salts of the alkaline earth metals are calcium sulfates, or mixtures thereof.

8. The thermoplastic composition according to claim 6, wherein the salts of the alkaline earth metals are calcium phosphates, or monobasic, dibasic, and tribasic magnesium phosphates and hydrates thereof.

9. The thermoplastic composition according to claim 1, wherein the first polymer of the continuous phase
   (a) has biogenic or partially biogenic components and/or is selected from a group of polyhydroxy acids, polyhydroxyalkanoates, polylactides, and lignins, and their derivatives and/or copolymers, and/or
   (b) has synthetic components and is selected from a group of aliphatic and aromatic polyesters and aliphatic-aromatic copolyesters.

10. The thermoplastic composition according to claim 1, wherein as a further dispersed phase, the composition comprises at least one amorphous or semicrystalline polymer.

11. The thermoplastic composition according to claim 10, wherein the amorphous or semicrystalline polymer is a polymer or copolymer of polylactic acid (PLA), or a polymer or copolymer of polyhydroxyalkanoate (PHA), or a mixture of at least two of the aforementioned.

12. The thermoplastic composition according to claim 1, wherein the biogenic crosslinking agent of the dispersed phase comprises polysaccharidic structural elements which originate from a group that includes starches, each of which contains-amylose and amylopectin.

13. The thermoplastic composition according to claim 12, wherein the biogenic crosslinking agent of the dispersed phase comprises at least one additional polysaccharidic structural element.

14. The thermoplastic composition according to claim 10, wherein the ratio of the polysaccharidic structural elements of the dispersed phase to the at least one first polymer of the continuous phase is 10 to 90 wt. %, with reference to the sum of the polysaccharidic structural elements of the dispersed phase to the at least one first polymer of the continuous phase.

15. The thermoplastic composition according to claim 1, wherein the composition is biodegradable and/or compostable.

16. The thermoplastic composition according to claim 1, wherein the plasticizer diglycerol has an enantiomeric ratio of
   (d) α,α'-diglycerol from 40 to 65 wt. %,
   (e) α,β-diglycerol from 25 to 40 wt. %, and
   (f) β,β'-diglycerol from 2 to 10 wt. %
with reference to the sum of the α,α'-, α,β-, and β, β'-diglycerol.

* * * * *